Dec. 24, 1946.  G. W. PONTIUS, 3D., ET AL  2,413,114
GUN TURRET
Filed Jan. 18, 1943   7 Sheets-Sheet 3
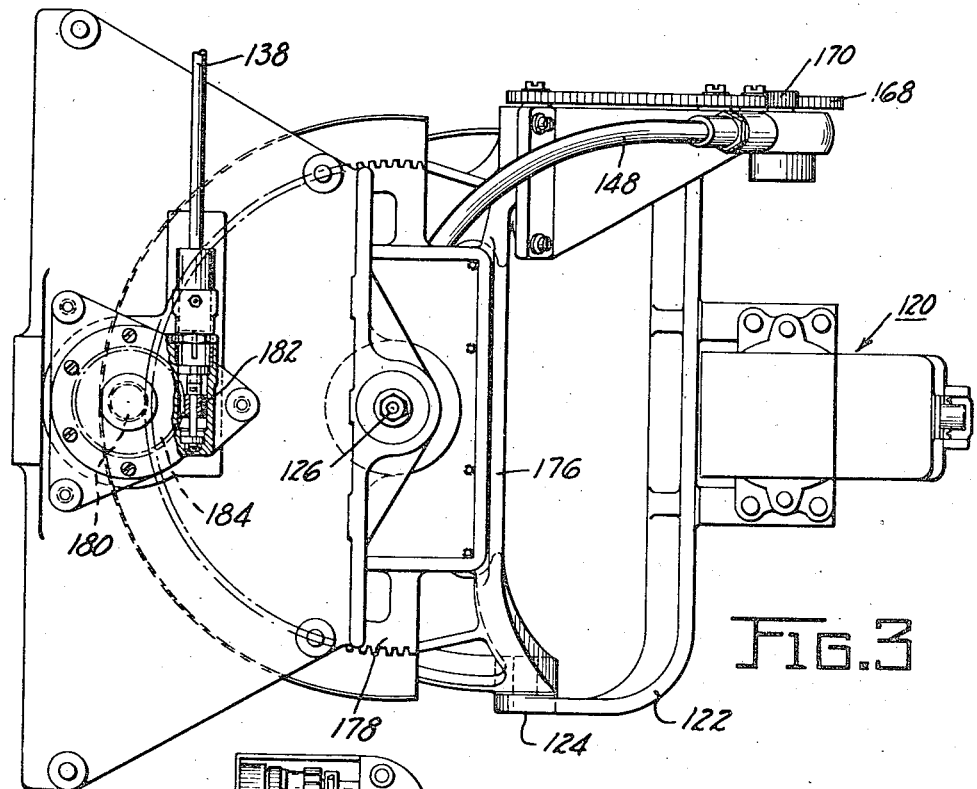
FIG.3
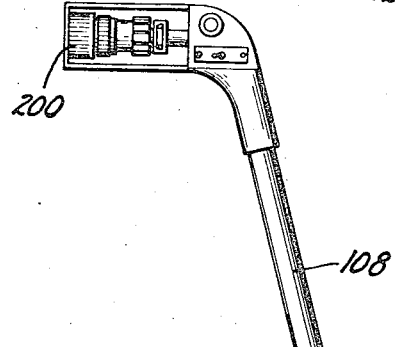
FIG.7
INVENTORS
GEORGE W. PONTIUS III
FRANK V. KUZMITZ
BY
A. R. McCrady

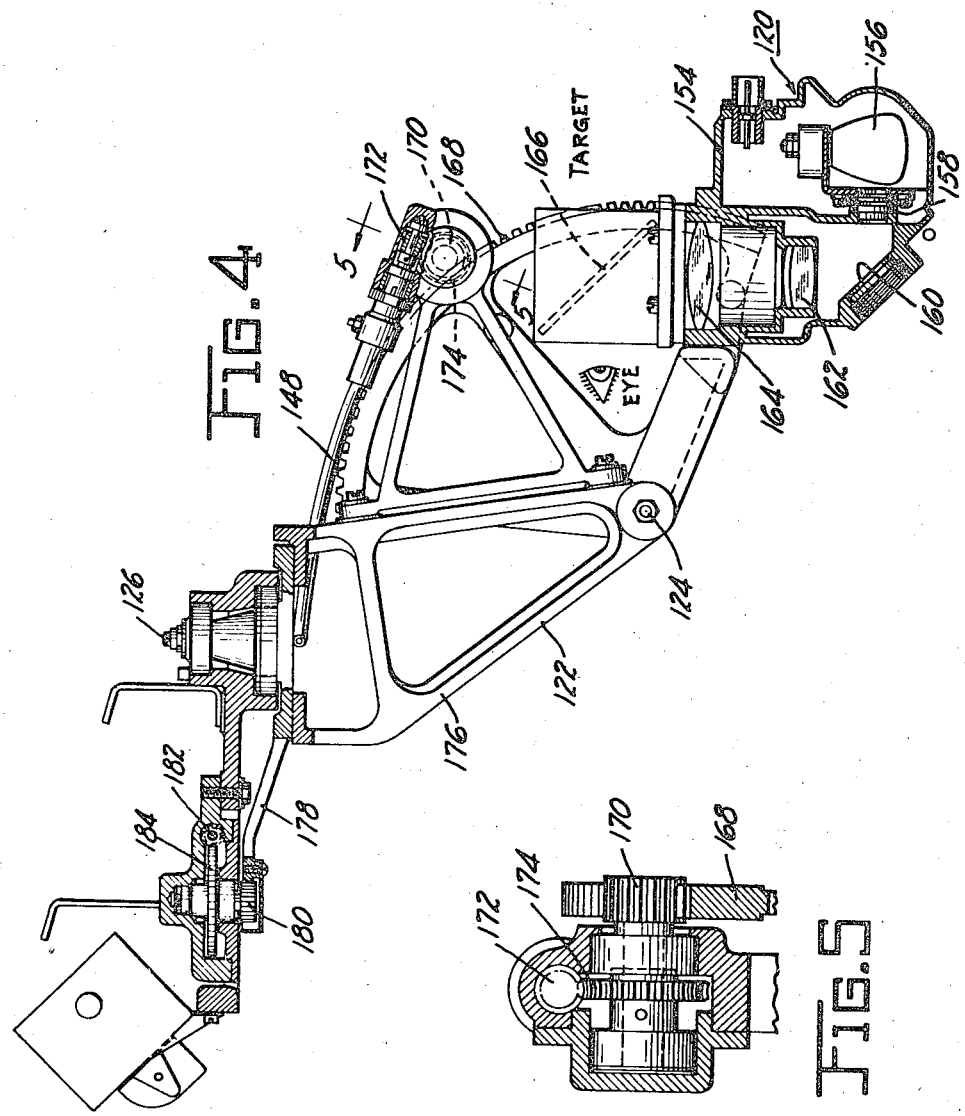

Dec. 24, 1946.  G. W. PONTIUS, 3D., ET AL  2,413,114
GUN TURRET
Filed Jan. 18, 1943   7 Sheets-Sheet 5

INVENTORS
GEORGE W. PONTIUS III
FRANK V. KUZMITZ
BY
A. R. McCrady

Dec. 24, 1946.     G. W. PONTIUS, 3D., ET AL     2,413,114
GUN TURRET
Filed Jan. 18, 1943     7 Sheets-Sheet 6
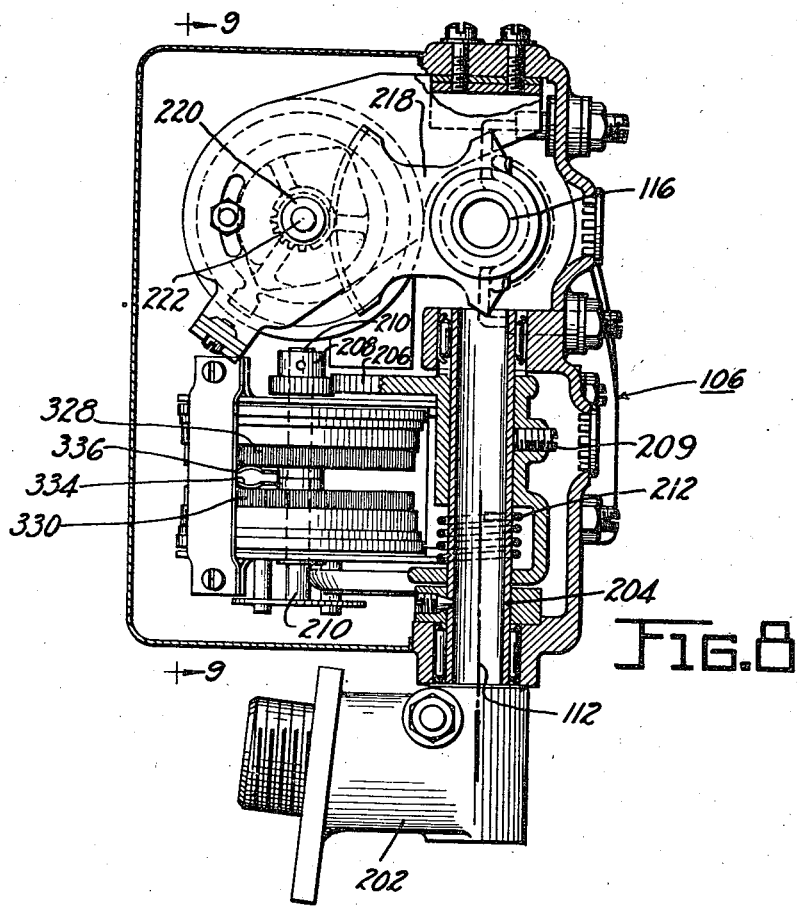
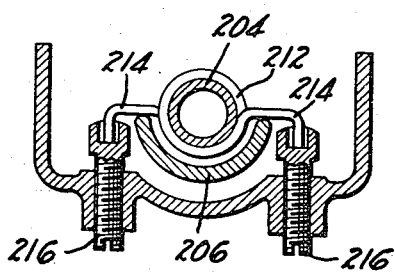
INVENTORS
GEORGE W. PONTIUS III
FRANK V. KUZMITZ
BY
A. R. McCrady

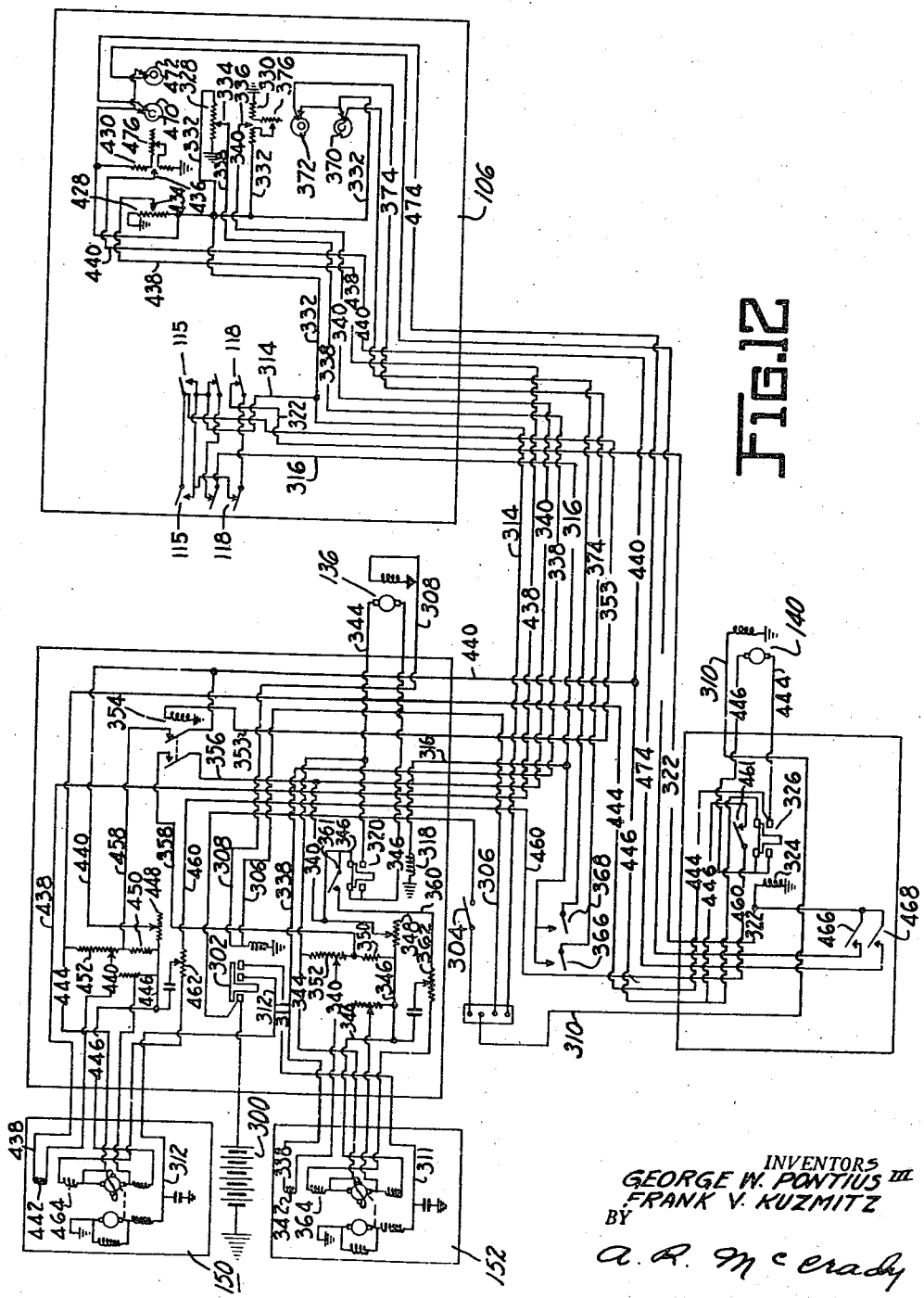

UNITED STATES PATENT OFFICE 2,413,114

GUN TURRET

George W. Pontius, III, and Frank V. Kuzmitz, South Bend, Ind., assignors to Bendix Aviation Corporation, South Bend, Ind., a corporation of Delaware Application January 18, 1943, Serial No. 472,716

4 Claims. (Cl. 89—37.5)

This invention relates generally to turrets and particularly to turrets of the type which may be employed in aircraft. More particularly, the invention relates to aircraft turrets which may be located in the bow or the stern of the fuselage of an aircraft for improving the defense of these vital areas.

While the invention is shown as being adapted to the bow of the fuselage, so that the bombardier may at times act as a gunner in defending the forward part of the aircraft, it will be apparent in the course of the description hereinafter that the invention may be equally as well employed in the defense of the aft portions of the aircraft.

Where the gunner is stationed in the bow or stern of the fuselage, opportunity is afforded to scan with the naked eye the field of view, since it is the general practice to have these portions of the aircraft furnished with transparent plastic material. Where the turret guns are positioned below the gunner's station it becomes necessary then to supply some sort of sighting means which is coordinated with the movements of the guns in azimuth and elevation whereby the gunner may view the target field of the turret guns; since the gunner may easily follow the sight in azimuth and elevation with his head at the eyepiece of the sight, a simple and effective sighting arrangement is thus effected.

A further desirable advantage in such a turret lies in having the control for the movements of the guns in azimuth and elevation arranged in such a manner that a measure of "feel" is given to the gunner in operation of the turret, i. e., to have increasing displacement of the control in any direction give increasing speed of travel of the guns and the sight in the same direction. For example, the movements of the control may be resolved into two components, viz., the movement about a vertical axis to give azimuth movement to the guns, and the movement about a horizontal axis to give elevational movement to the guns. As explained above, giving increased displacements of the control about these axes will, in the instant device, give corresponding increments in speed of travel of the guns in both azimuth and elevation.

Since at times target ships are moving in the field or fire of the guns at very high speeds, it is desirable to have the control so arranged that the tracking speeds of the guns may be varied for normal speeds and for very fast or "slewing" speeds. Means are provided in the control for changing a circuit controlling the speed of the guns for both the normal tracking speeds required and the slewing speeds whereby the gunner may keep the target ship fixed within the sight.

The successful tracking of a target is dependent upon the operator's ability to control the angular velocity of the guns without their being influenced by factors such as wind loads, frictional loads and recoil forces. The new and improved turret accordingly makes use of a control circuit having therein a pair of motor-generator sets or motor-amplidynes for furnishing current to the azimuth and/or elevation drive motors of such value that, irrespective of the load factors on the guns, there will be maintained an angular velocity of the guns according to the control handle position.

An important consideration in the design and placement of gun turrets includes the provision of both automatic and mechanical stops or limits to prevent movement of the guns at the end of their permissible limit of travel in both azimuth and elevation. Thus, a turret mounted in the bow of the fuselage must be limited in its permissive azimuth travel, so that the guns will not point and fire into the engine nacelles and the wings. Similarly, the elevation travel of the guns is limited as desired. Necessary also with the provision of limits or stops is the requirement that the guns may travel only in the opposite direction when the limit in one direction has been reached, thereby insuring that no harm is done to the drive motors or any of the mechanical parts.

The rapidity with which the turret guns can respond to movement of the control being of utmost importance in the defense of the aircraft, it is therefore desirable that the movement of the control effect an immediate movement of the guns, and, accordingly, a feature of the control lies in the fact that it has no "dead spot" through which it must be moved before a movement of the guns is had.

With the foregoing problems in mind, it is an object of this invention to provide a power operated turret having a sight synchronized in its movements therewith, which will enable the gunner to follow the target field with a minimum of effort on his part, the sight being movable in the same direction as the head and eyes of the gunner in following the target.

Another object is to provide a novel control arrangement for the use of the gunner in laying the turret guns on the target.

A further object includes the provision of novel means for giving "feel" to the gunner in moving the guns in azimuth and elevation.

A still further object includes the provision of a quickly operated controller adjustment whereby the gunner may move the guns at moderate tracking speeds or at high or slewing tracking speeds.

Yet another object is to provide a novel control for an aircraft turret wherein the displacement of the controller is a function of the angular speed of the guns in azimuth and elevation.

Another object is to provide a controller characterized by the absence of a "dead spot," so that as soon as an initial displacement of the controller is had, there will be an immediate tracking movement of the guns in azimuth or elevation or in combination of the two.

A still further object of the invention comprehends the use of motor-generator sets or motor-amplidyne sets for speed control of the azimuth and elevation drive motors whereby their speed may be accurately controlled regardless of the various load factors to which the guns are subjected.

A yet further object of the invention includes the provision of mechanical and electrical means to limit the angular travel of the guns.

Still another object includes the provision of novel means for insuring that the guns must travel in the opposite direction when the guns have reached the mechanical limit of travel in one direction, thereby insuring against injury to the guns and the turret mechanism.

A yet further object is to provide dynamic braking to the guns as they reach their limit of angular travel, so that they will not coast into the mechanical stops.

While the invention is disclosed with reference to its employment in the bow of the fuselage, it will be obvious that features of the invention are not limited to the use shown, the speed control system and the controller being readily adapted to the turrets disclosed in Pontius application Serial No. 391,911, filed May 5, 1941, Pontius application Serial No. 429,439, filed February 4, 1942, and Kuzmitz et al. application Serial No. 471,124, filed January 2, 1943. It is to be distinctly understood, also, that the invention is not limited otherwise than by the appended claims.

In the drawings which show a preferred embodiment of the invention:

Figure 3 is a plan view of the sight shown in Figure 1;

Figure 4 is an elevation view of the sight shown in Figure 3 looking toward the opposite side from that seen in Figure 1;

Figure 5 is an enlarged section taken along the lines 5—5 in Figure 4;

Figure 7 is an enlarged view of the controller support arm shown in Figure 1;

Figure 8 is a section taken along the lines 8—8 in Figure 6;

Figure 11 is a section taken substantially along the lines 11—11 in Figure 9; and Figure 12 is a schematic diagram for the control circuit of the turret shown in Figure 1.

Figure 1:
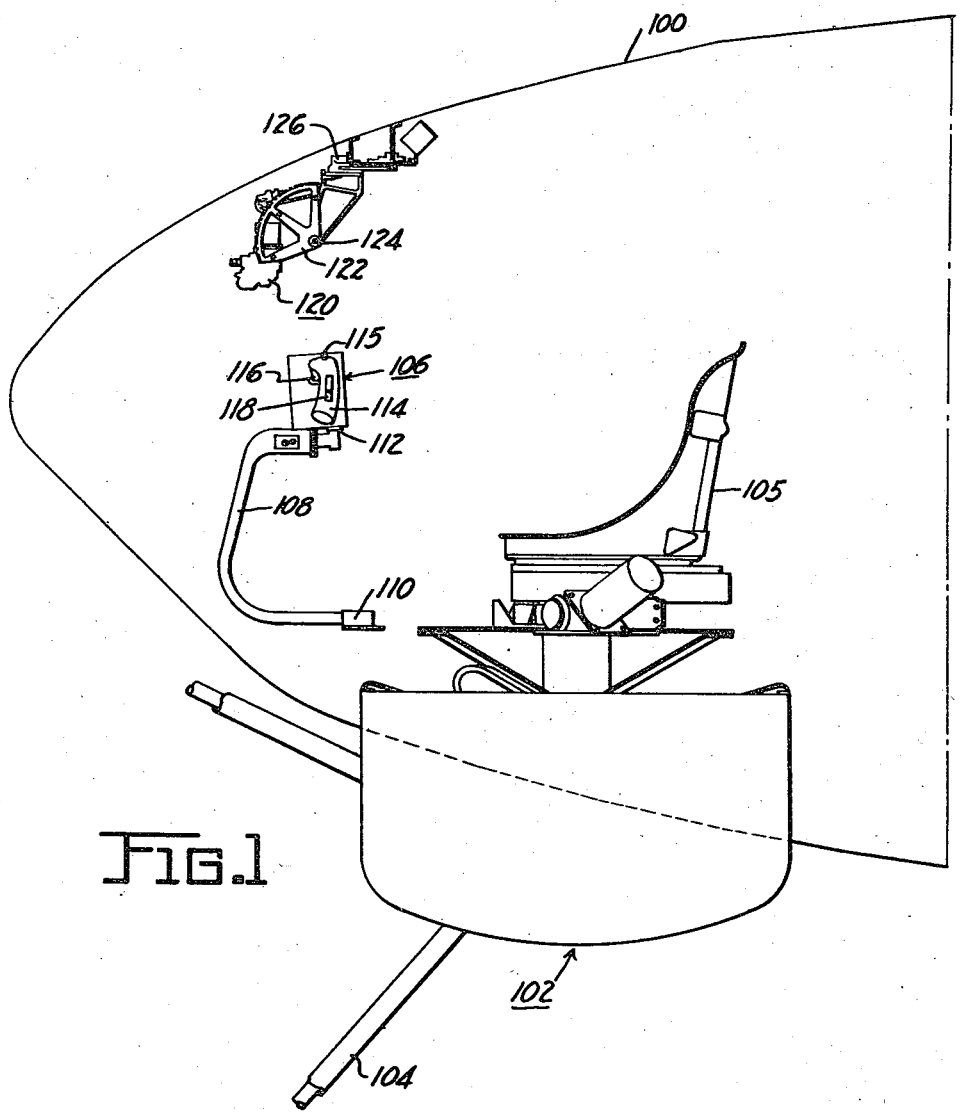
Figure 1 is a longitudinal section of an airplane fuselage near the bow thereof, certain of the elements forming a part of the invention being shown in elevation.

Referring now to Figure 1 of the drawings, a fuselage 100 of an airplane supports a turret 102 which has mounted therein guns 104 which are arranged to rotate with the turret 102 in azimuth and to rotate with respect to turret 102 in elevation. A seat 105 is slidably mounted atop the turret 102 so that a gunner-bombardier may adjust his position to operate the turret 102 or a bomb-sight (not shown) mounted in the extreme forward portion of the fuselage 100.

A controller 106, supported on arm 108 pivoted at 110 is adapted to be operated by the gunner for moving the turret, or to be moved to one side of the fuselage 100 out of the gunner's way, when he is operating the bomb-sight. As will be described with particularity later, the controller 106 pivots about 112 for controlling the movement of guns 104 in azimuth, controller 106 being so arranged that increasing angular displacement about axis 112 gives increasing angular tracking speed of the guns 104.

A pair of handles 114 (one being shown) are mounted on a shaft 116 and rotate with respect to the controller 106 for controlling the elevation movement of the guns 104, handles 114 being so arranged that clockwise rotation causes upward movement of the guns 104 in elevation and counter-clockwise rotation causes downward movement of the guns 104 in elevation. Handles 114 are also arranged that increasing angular displacement both in a clockwise and a counter-clockwise direction gives increasing tracking speeds to the guns 104 in elevation either up or down.

For giving high tracking or slewing speeds in both azimuth and elevation a high speed switch 115 is provided which may be closed at the will of the gunner.

A "dead man" control is provided for the controller 106 consisting of a switch 118 which is opened when the gunner grasps control handles 114. Switch 118 controls the flow of all current to the control circuit for the drive motors of the turret 102, so that the turret 102 may not be operated excepting under the control of the gunner.

A sight 120 is provided for the gunner to observe the field of fire of the guns 104, and is synchronized with the movements of the guns 104 both in azimuth and elevation. Sight 120 is held in a mounting bracket 122 which is so arranged that it may rotate about axis 124 in synchronism with the elevation movements of the guns 104 and about a second axis 126 in synchronism with the azimuth movements of the guns 104.

Figure 2:
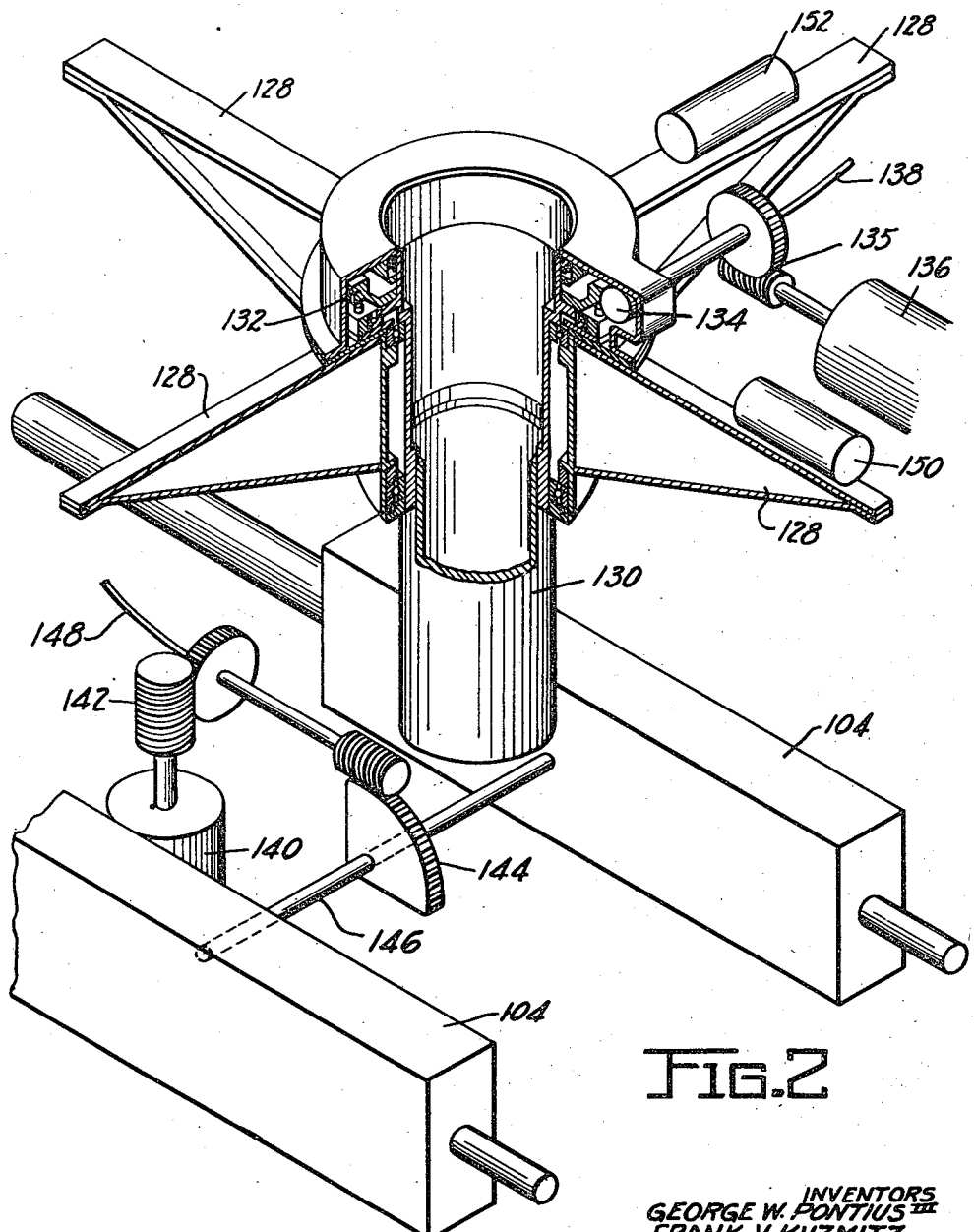
Figure 2 is a schematic, isometric view of the turret showing the mechanical parts and movements, and showing schematically the motor-generator or motor-amplidyne sets for supplying current to the drive motors.
Figure 6:
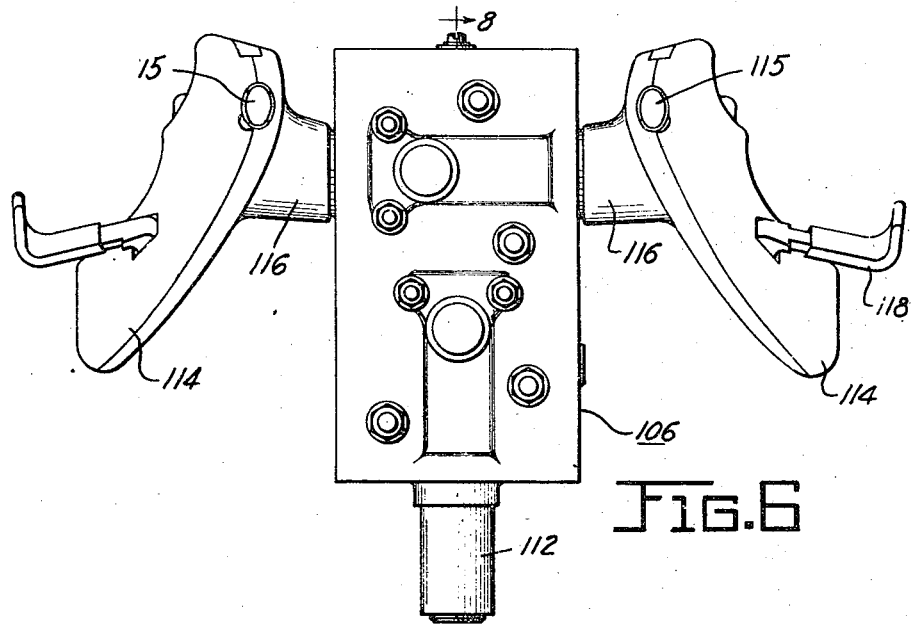
Figure 6 is an elevation view of the controller looking from the right in Figure 1.

Referring to Figure 2, turret 102 is supported within the fuselage 100 by a four-arm spider 128, the extermities of which are fastened to the fuselage 100 in any convenient manner. Adapted to rotate at the center of spider 128, and supported thereby, is a center column 130 which has secured near the top thereof a worm-wheel 132 which is driven by a worm 134 suitably connected as by a gear train 135 to an azimuth drive motor 136.

For effecting the azimuth movement of the sight 120 in synchronism with the azimuth movement of the center column 130 of the turret 102, a flexible shaft 138 is connected to the gear train 135.

Depending from the lower end of column 130 are the guns 104, which are driven in elevation by a drive motor 140, which through gear trains 142 and 144 effect rotative movement to a shaft 146 at the ends of which are mounted the guns 104 for corresponding elevation movement.

For effecting the elevation movement of the sight 120 in synchronism with the elevation movement of the guns 104, a flexible drive shaft 148 is connected to gear train 142.

Mounted on the spider 128 are a pair of motor-generator sets or motor-amplidyne sets 150 and 152 which respectively furnish current and voltage to drive motors 136 and 140 at desired azimuth and elevation tracking speeds according to the displacement of the controller 106, and irrespective of the load on the motors 136 and 140 in moving the guns 104. Reference will be had later to Figure 12 for details of the circuit for controlling the drive motors 136 and 140, the motor-generator sets 150 and 152 in response to the displacement of controller 106.

The details of sight 120 are shown in Figure 4, and as shown, sight 120 is mounted at the lower and forward end of bracket 122. Sight 120 includes a lamp housing 154 which supports a lamp 156 therein whose rays impinge against a reticle 158 of any desired pattern, as for example, a circle. Rays which pass the reticle 158 are reflected from a mirror surface 160 upwardly past a collimating lens system 162, 164, whence they are reflected from a second mirror 166 into the eye of the gunner. Mirror 166 is of the fractionally illuminized type, i. e., it reflects the reference pattern passed by the reticle 158 and transmits through itself light rays from the target field view by the gunner or bombardier.

For moving the sight 120 in synchronism with the movement of the guns 104 in elevation, the mounting bracket 122 is pivoted about 124 and has in the circular periphery thereof external gear teeth 168 which mesh with a pinion 170 (Figures 4 and 5), which is driven by a worm 172 mounted at the end of the flexible shaft 148, and a worm wheel 174.

Similarly, for moving the sight 120 in synchronism with the movement of the guns 104 in azimuth, the mounting bracket 122 is journalled at 124 in a yoke 176 which is pivoted at 126. Yoke 176 is provided with a gear sector 178 which meshes with a pinion 180 driven by flexible shaft 138 through a worm 182 mounted at the end thereof, and a worm wheel 184, to effect rotation of the yoke 176 and the sight 120 about pivot point 126 in synchronism with the azimuth movements of the guns 104.

It will be seen, therefore, that the assembly just described gives synchronized movement of the sight 120 with the movement of the guns 104 in both azimuth and elevation.

The details of controller 106 will best be understood with reference to Figures 6 to 11 inclusive. Controller 106 is secured to control support arm 108 by means of a union 200 which threadably engages a support member 202 of the controller 106.

A pair of control potentiometers 328 and 330 are held fixedly in the controller 106 and are adapted to be contacted by a pair of wiper arms 334 and 336 for picking off a voltage differential for exciting an exciter field of azimuth motor-amplidyne set 152, as will be more fully described with reference to Figure 12. For changing the position of wiper arms 334 and 336, as the control 106 moves about vertical axis 112, a stationary vertical shaft 204 is provided which has mounted at one end thereof a gear sector 206 which driveably engages a pinion 208 mounted on a shaft 210 which rotates therewith. Gear sector 206 is secured to shaft 204 by a set screw 209. Wiper arms 334 and 336 are mounted on the shaft 210 to rotate therewith, and it will be seen that as the control 106 is shifted angularly about the pivot 112, the wiper arms 334 and 336 move with respect to the potentiometers 328 and 330.

For returning the control 106 to neutral position, and for moving the control 106 angularly against a small force to give a measure of "feel" to the gunner to a coiled spring 212 is mounted around shaft 204, the ends 214 of which are held against movement in the neutral position by means of adjusting screws 216 threaded into the body of control 106. As the control 106 rocks about axis 112 the gear sector 206 will tend to coil spring 212 about the shaft 204 thereby increasing the force necessary to displace control 106 about axis 112.

Figures 9, 10:
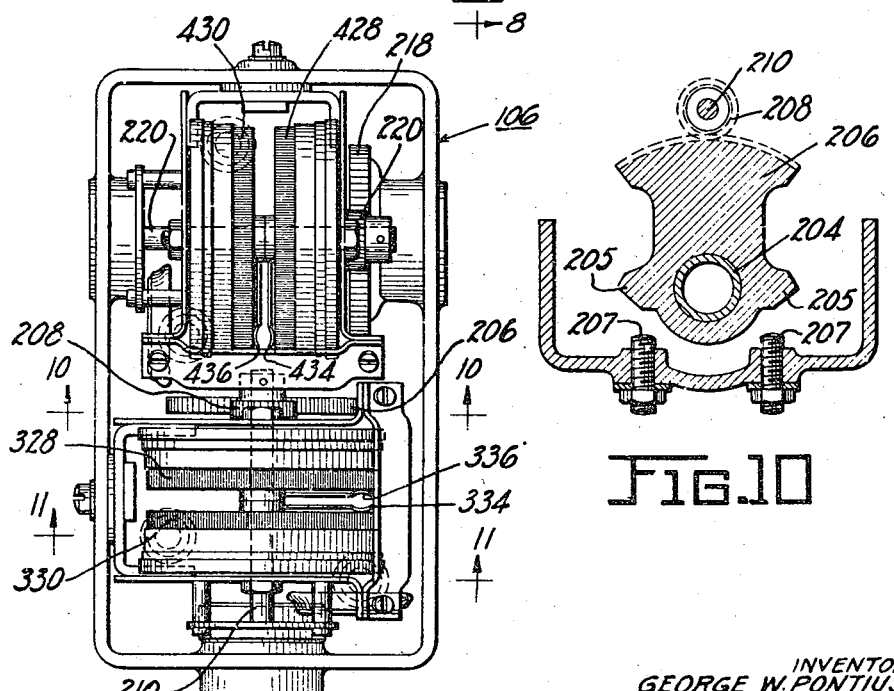
Figure 9 is a view partly in section, and partly in elevation along the lines 9—9 of Figure 8.
Figure 10 is a view taken along the lines 10—10 of Figure 9, showing details of the controller seen in Figure 1.

Means are provided to prevent the travel of control 106 about axis 112 beyond a position where injury to the potentiometers 328 and 330 and the control 106 might occur. As shown in Figure 10, gear sector 206 is provided with a pair of ears 205 which engage stops 207 adjustably threaded into the body of controller 106.

Elevation movement of the guns 104 is effected by moving handles 114 about their axis 116. Rotation of handles 114 effects rotation of a gear sector 218 which driveably engages a pinion 220 mounted on a shaft 222 which carries a pair of potentiometer wiper arms 434 and 436 which contact a pair of potentiometer windings 428 and 430. In a similar fashion to wiper arms 334 and 336, wiper arms 434 and 436 pick off a voltage differential which is applied to the elevation motor-amplidyne set 150, as is more particularly described with reference to Figure 12.

For giving "feel" to the gunner, gear sector 218 is similarly provided with a spring as shown in Figure 11, and for preventing movement in excess of a desired amount of the controller handles 114, gear sector 218 is provided with adjustable stops similar to those shown in Figure 10.

The control of the guns 104 both in azimuth and elevation will best be understood with reference to Figure 12 which is a schematic diagram of the circuit controlling the azimuth and elevation motor-amplidyne sets 152 and 150, azimuth and elevation drive motors 136 and 140. Controller 106 is shown schematically also in its relation to the control circuit of Figure 12.

A source 300 is provided to furnish power to the azimuth and elevation drive motors 136 and 140 and to the azimuth and elevation motor-amplidyne sets 152 and 150 through a power relay 302 by closing a main power switch 304 which energizes the winding of relay 302 through conduit 306. Passing current through conduit 306 at the same time passes current through a conduit 308 to energize the field of azimuth drive motor 136. The closing of switch 304 at the time passes current to a lead 310 to energize the field winding of elevation drive motor 140.

Simultaneously with the closing of the power relay 302 is the passing of current through lead 312 to the motor of the elevation motor-amplidyne set 150. Similarly, with the closing of power relay 302 current is passed to the motor of the azimuth motor-amplidyne at 152 through a lead 311. It will be seen, then, that as long as the main power switch 304 is closed the motor-amplidyne sets or motor-generator sets 150 and 152 will operate continuously, and, as will be explained hereinafter, the output of the generator or amplidyne side of sets 150 and 152 will vary according to the load and speed, as determined by the position of controller 106 in azimuth and elevation drive motors 136 and 140.

As has been partly described with reference to Figure 1, safety means are incorporated into the control circuit of Figure 12 to insure that the guns 104 are not moved except when the control handle 114 of Figure 1 is grasped. Safety switches 118 of Figure 1 are shown schematically in Figure 12, the left switch of the pair of switches 118 being the one mounted in the left one of the pair of control handles 114 of Figure 1. Switches 118 are normally closed, i. e. when the gunner does not grasp either of control handles 114, so that the armatures of the drive motors 136 and 140 are disconnected from the output side of the motor-amplidyne sets 152 and 150, and the armatures thereof are shorted; and since the armatures are in a strong field furnished by the field windings of the drive motors 136 and 140, the armatures thereof are immediately dynamically braked. Controller 106 is so arranged that dynamic braking of the drive motors 136 and 140 is effected only when neither of the control handles is grasped by the operator or gunner. Since the "dead man" switches 118 are of the normally closed type, opening only when one or both of the control handles 114 is grasped, dynamic braking will not occur until both hands are freed from the controller handles 114. The circuit for effecting dynamic braking when the control handles are freed by the gunner is as follows. Current is supplied by lead 314 to switch group 118 whence it passes out a lead 316 to energize a winding 318 of an azimuth dynamic braking relay 320. Similarly, current is passed out of switch group 118 by a lead 322 to energize a winding 324 of an elevation dynamic braking relay 326. It will be noted that when windings 318 and 324 are energized, the armatures of relays 320 and 326 are attracted downwardly, thereby shorting the armatures of drive motors 136 and 140. It may be noted that when the armatures of relays 320 and 326 are attracted downwardly, the current supplied by the output sides of motor-generator sets 152 and 150 is thus cut off from the armatures of drive motors 136 and 140.

Tracking speeds for the drive motors 136 and 140 are selected in accordance with the position of the controller 106 shown in Figure 1. Moving controller 106 about axis 112 to the right or clockwise, for example, causes guns 104 to move to the right or clockwise. Increased angular displacement of the controller 106 about axis 112 clockwise, causes the tracking speed in azimuth clockwise to increase. It will be seen, therefore, that speed of the guns 104, is a function of the position of controller 106.

Similarly, movement of controller handles 114 in a clockwise direction as viewed in Figure 1, causes guns 104 to move up in elevation, and the speed will be a function of the controller handle position.

For giving the increased tracking speeds of the guns 104 according to the angular displacement of the controller 106 without the tracking speeds being affected by the loads on the guns 104, a circuit for controlling the speed of the drive motors 136 and 140 irrespective of the loads thereon is shown in Figure 12. The circuit will first be described with reference to the azimuth movement of the guns 104.

As has been described previously, closing the main power switch 304 passes current to the field of azimuth drive motor 136, and starts the azimuth motor-amplidyne set 152. Closing main power switch 304 also energizes the pair of azimuth control potentiometers 328 and 330 (shown in Figures 8 and 9) through a conductor 332. The pair of potentiometer wiper arms 334 and 336 (shown in Figures 8 and 9) are so linked to the controller 106, that as controller 106 is displaced angularly to the right, or clockwise, the potentiometer wiper arms 334 and 336 are moved to the right as shown in Figure 12. As the controller 106 is moved from the neutral position as shown in Figures 1 and 12 in a clockwise direction, wiper arm 334 moves toward the positive end of potentiometer 328 and wiper arm 336 moves toward the negative end of potentiometer 330. The voltage that exists across wiper arms 334 and 336 is thus a function of the position of controller 106 and is applied by a pair of leads 338 and 340 to an exciter field 342 of the amplidyne side of motor-amplidyne set 152. Voltages thus applied to the exciter field 342 cause the amplidyne side of motor-amplidyne set 152 to generate an output voltage across a pair of leads 344 and 346 which is proportional to the exciter voltage applied to field 342, and several times the voltage across wiper arms 334 and 336. However, the power input to the exciter field 342 may never exceed one watt while the output power of the motor amplidyne 152 may be several hundred times as much.

Thus the circuit described has not taken into account the effect of load on azimuth drive motor 136 caused by recoil forces of the guns 104 and movements thereof in the slipstream. In order to keep the drive motor 136 running at a speed corresponding to controller position alone, means are provided to correct for the factor of changing loads on the azimuth drive motor 136.

It will be noted that wiper arm 334 is directly connected by lead 338 to the exciter field 342. However, wiper arm 336 is connected to exciter field 342 not only through lead 340 but also through a resistor circuit consisting of resistors 348, 350, and a part of resistor 352. As soon as the voltage across leads 344 and 346 begins to rise, the voltage across resistor 350 and the bottom part of resistor 352 opposes the voltage from the wiper arms 334 and 336, thus reducing the current to exciter field 342. A stable point of balance is thus immediately reached.

It will be seen that when the output voltage of the amplidyne side of motor-amplidyne set 152 is lowered because of increased load on azimuth drive motor 136, the opposing voltage across resistor 350 and the bottom part of resistor 352 decreases, and more current flows to the exciter field 342. Conversely, if the output voltage from the amplidyne side of motor-amplidyne set 152 increases, because of lighter loads on azimuth drive motor 136, the opposing voltage across resistor 350 and the bottom part of resistor 352 increases. This tends to keep the output voltage constant, regardless of load on azimuth drive motor 136, for any given position of the controller 106.

When a load is applied to the drive motor 136, it tends to slow down, at the same time drawing more current from motor-amplidyne set 152. This current flows through lead 346 through the dynamic braking relay 320 and through resistor 348, causing a voltage drop therein. Since resistor 348 is in the circuit for wiper arm 336, this voltage drop is added to the voltage from wiper arms 336 and 334, bringing the amplidyne output voltage up, and it thereby brings the speed of motor 136 back to its no-load value.

For obtaining high tracking or slewing speeds of the guns 104 in azimuth, means are provided in the control circuit just described for obtaining high output voltages from the motor-amplidyne set 152 for the azimuth drive motor 136. Closing either one of the pair of high speed switches 115 of Figures 1 and 12 passes current from lead 314 through one or both of switches 115 to a lead 353 and thence to a relay 354. When the left of the pair of armatures associated with relay 354 moves to the right, resistor 350, which furnishes part of the opposing voltage, is shorted out. Current flowing in lead 340 then takes a path through lead 356, through the left-hand armature of relay 354, through lead 358 and directly to the bottom part of resistor 352. At such time the voltage supplied by wiper arms 334 and 336 is not opposed by as great a voltage as part of the resistor circuit has been shorted out, and, therefore the voltage supplied to exciter field 342 is correspondingly increased.

For the purpose of cancelling any excitation of the amplidyne, including the excitation due to residual magnetism, thus bringing the amplidyne output voltage down to zero when dynamic braking is applied to drive motor 136, an anti-shunt field for the motor-amplidyne set 152 is provided. Switches 118 are of the normally closed type, closing when the gunner does not grasp controller handles 114. At such times as both of switches 118 are closed, winding 318 of relay 320 will be energized, causing dynamic braking of azimuth drive motor 136 by shorting the armature thereof. An armature 361 is associated with relay 320 which moves downwardly when relay 320 is energized, closing as a switch. Current from the amplidyne side of motor-amplidyne set 152, which flows in lead 346, passes into lead 360 through a current-limiting resistor 362 and thence to an anti-shunt field 364, which furnishes a field opposite in direction to the other fields of amplidyne 152, and thence to lead 344. It will be seen, then, that the output voltage of amplidyne 152 immediately falls to zero or very close to zero.

For preventing movement of the guns in azimuth beyond a permissible limit of travel a pair of limit switches 366 and 368 are provided. Limit switch 366 in conjunction with a limit selector switch 372, prevents clockwise rotation beyond a predetermined limit when controller 106 is displaced to give clockwise movement of the guns in azimuth, and when both are closed energizes dynamic braking relay 320. The circuit for effecting dynamic braking is made through lead 332, adjacent a pair of limit selector switches 370 and 372, a lead 374 through clockwise limit switch 366 and thence to winding 318 of relay 320 through lead 316. Limit selector switches are moved with the controller 106 and overlap, so that when the controller 106 is going through the neutral position to effect movement of the guns in the opposite direction, i. e., while the controller is changing the polarity of wiper arms 334 and 336 with respect to each other, there can be no possibility that the failure of the amplidyne output polarity, and thus direction of azimuth drive motor 136, to change immediately as the polarity of the wiper arms 334 and 336 changes will cause the guns 104 to be driven through the clockwise mechanical limitations of travel because of selection of the wrong limit switch 366 or 368.

Means are provided for eliminating "deadspots" on the controller 106. It will be seen in Figure 12 that potentiometer 330 is divided at the mid or neutral point, and wiper arm 336 is so arranged that it contacts both halves of the divided potentiometer 330 when the controller 106 is in the neutral position. An adjustable rheostat 376 connects the two halves of potentiometer 330, and as soon as arm 336 is moved whereby wiper arm 336 contacts only one of the halves of divided potentiometer 330, an immediate and controllable voltage across wiper arms 334 and 336 is set up.

While the operation and control of the speed of azimuth motor 136 has been described for effecting clockwise motion of the guns 104 in azimuth, it will be seen that to effect counterclockwise movement of the guns 104 in azimuth, the wiper arms 334 and 336 will move to the left. This movement will reverse the current in the exciting field 342 and will reverse the current output on the amplidyne side of azimuth motor-amplidyne set 152.

The operation of the azimuth drive system has been described with particularity, and the elevation drive system is similar in operation. For the sake of brevity, however, detailed description of the elevation drive has been omitted, but parts corresponding to the parts of the electrical system for the azimuth drive have been given ordinals corresponding to those in azimuth, except that the ordinals are in the 400 series.

The above-described circuit which is not basically or broadly of our invention as a control of general application, but which involves features of novelty in the described combination, for the purposes of convenience and succinctness in the claims is called "motor-generator means."

The operation of the turret described above is as follows:

The gunner or bombardier occupies seat 105 which he may slide forward so that he can grasp controller 106 at the control handles 114 and at the same time peer through sight 120 at its eyepiece. Closing the main power switch 304 passes current to the motor-amplidyne sets 150 and 152 and the field windings of drive motors 136 and 140, placing them in a "make-ready" condition to receive control voltages from the controller 106 in accordance with its position.

By moving controller 106 clockwise about its axis 112, clockwise rotation of the guns 104 in azimuth will take place, and the speed of rotation will be a function of the clockwise displacement of the controller 106 about axis 112. Counterclockwise rotation of the controller effects in a similar manner the counterclockwise rotation in azimuth of guns 104.

By moving controller handles 114 clockwise about their axes 116 the guns 104 will be moved upward in elevation about shaft 146 (Figure 2). As in the case with the azimuth movement of the guns 104, increasing tracking speed is effected by increasing the displacement of controller handles 114 about axes 116. Counterclockwise rotation of the controller handles 114 causes the guns to move down in elevation about shaft 146.

Since sight 120 is synchronized with the azimuth and elevation movements of guns 104 through the medium of sight drive cables 138 and 148, the gunner may observe the target field of the guns as they swing in azimuth and elevation; or conversely, having kept the sight 120 on the target, his guns will also be trained on the target.

Any convenient means may be employed for firing the guns 104 when they are trained on the target, as for example as shown in Pontius application Serial No. 391,911, filed May 5, 1941, and Pontius et al. application Serial No. 439,622, filed April 20, 1942. A firing switch for the guns 104 may be conveniently mounted in each of the controller handles 114, or any other convenient place according to designer's choice.

For giving increased tracking or slewing speeds the gunner closes one of the high speed switches mounted in controller handle 114, and then the high tracking speeds may be varied according to the angular displacement of control 106 and control handles 114.

As has been explained with reference to Figure 12, when the guns 104 reach their mechanical limit of travel in azimuth and elevation drive motors 136 and 140 are immediately dynamically braked. The gunner then is able to move the guns in the opposite direction only, which he does by reversing the direction of movement of control 106 and controller handles 114.

While the invention has been described with reference to a preferred embodiment it is to be understood that the invention is not limited in scope except by the claims which are hereto appended.

We claim:

1. A turret for use in the bow or stern portions of an aircraft or the like comprising, in combination, a turret member, a mounting for said turret member carried by said aircraft, a gun mounted on said turret member for rotation therewith in azimuth and constructed and arranged to rotate with respect to said turret member in elevation, a sight synchronized in its movements with the azimuthal and elevational movement of said gun and constructed and arranged to enable a gunner peering into the said sight to observe the field of fire of the gun, means including a pair of flexible cables connecting said turret member and gun to said sight to impart movement thereto corresponding to movement of the gun, power means for rotating said turret member with the gun in azimuth, motor generator means for supplying voltage and current to said power means in accordance with load and desired speed, a separately excited winding on the generator for furnishing an exciting field therefor, power means for rotating said gun in elevation, a second motor generator means for supplying voltage and current to the elevation power means in accordance with load and desired speed, a separately excited winding on said second-named generator for furnishing an exciting field therefor, and control means for both of said power means including a manually operated controller rotatable about a plurality of axes angularly displaced with respect to each other, said controller being normally held in a neutral position on said axes and constructed and arranged so that rotation from neutral in any direction about said axes selects the gun for corresponding movement in the selected direction, said control means also including a switch to be closed for changing the exciting field when an increase in the tracking speed is desired for any given position of the control from neutral, limit selector switch means associated with said control and arranged to respond to movement of said controller for limiting the movement of said gun, said limit means including conductors and a relay-controlled switch connected to each of said power means for dynamically braking said power means.

2. A turret for use in the bow or stern portions of an aircraft or the like comprising, in combination, a turret member, a mounting for said turret member carried by said aircraft, a gun mounted on said turret member for rotation therewith in azimuth and constructed and arranged to rotate with respect to said turret member in elevation, a sight synchronized in its movements with the azimuthal and elevational movement of said gun and constructed and arranged to enable a gunner peering into said sight to observe the field of fire of the gun, means including a pair of flexible cables connecting said turret member and gun to said sight to impart movement thereto, power means for rotating said turret member with the gun in azimuth, motor generator means for supplying voltage and current to said power means in accordance with load and desired speed, a separately excited winding on the generator for furnishing an exciting field therefor, power means for rotating said gun in elevation, a second motor generator means for supplying voltage and current to the elevational power means in accordance with load and desired speed, a separately excited winding on said second-named generator for furnishing an exciting field therefor, and control means for both of said power means including a manually operated controller rotatable about a plurality of axes angularly displaced with respect to each other, said controller being normally held in a neutral position on said axes and constructed and arranged so that rotation from neutral in any direction about said axes selects the gun for corresponding movement in the selected direction, the angular displacement of said controller from neutral determines the tracking speed of the gun, said control means including a switch to be closed for changing the exciting field when an increase in tracking speed is desired for any given position of the control from neutral, limit selector switch means associated with said control and arranged to respond to movement of said controller for limiting the movement of said gun, said limit means including conductors and a relay-controlled switch connected to each of said power means for dynamically braking said power means.

3. A turret for aircraft or the like comprising a turret member, a mounting for said turret member carried by said aircraft, a gun mounted on said turret member for rotation therewith in azimuth and arranged for rotation with respect thereto in elevation, power means for rotating said turret member with the gun in azimuth, motor generator means for supplying voltage and current to said power means in accordance with load and desired speed, a separately excited winding on the generator for furnishing an exciting field therefor, power means for rotating said gun in elevation, a second motor generator means for supplying voltage and current to the elevational power means in accordance with load and desired speed, a separately excited winding on said second-named generator for furnishing an exciting field therefor, and control means for both of said power means including a manually operated controller rotatable about a plurality of axes angularly displaced with respect to each other, said controller being normally held in a neutral position on said axes and constructed and arranged so that rotation from neutral in any direction about said axes selects the gun for corresponding movement in the selected direction, said control means including a switch to be closed for changing the exciting field when an increase in the tracking speed is desired for any given position of the control from neutral, limit selector switch means associated with said control and arranged to respond to movement of said controller for limiting the movement of said gun in the direction selected, said limit means including conductors and a relay-controlled switch connected to each of said power means for dynamically braking said power means.

4. A turret for aircraft or the like comprising a turret member, a mounting for said turret member carried by said aircraft, a gun mounted on said turret member for rotation therewith in azimuth and arranged for rotation with respect thereto in elevation, power means for rotating said turret member with the gun in azimuth, motor generator means for supplying voltage and current to said power means in accordance with load and desired speed, a separately excited winding on the generator for furnishing an exciting field therefor, power means for rotating said gun in elevation, a second motor generator means for supplying voltage and current to the elevational power means in accordance with load and desired speed, a separately excited winding on said second-named generator for furnishing an exciting field therefor, and control means for both of said power means including a manually operated controller rotatable about a plurality of axes angularly displaced with respect to each other, said controller being normally held in a neutral position on said axes and constructed and arranged so that rotation from neutral in any direction about said axes selects the gun for corresponding movement in the selected direction, the angular displacement of said controller from neutral determines the tracking speed of said gun, said control means including a switch to be closed for changing the exciting field when an increase in the tracking speed is desired for any given position of the control from neutral, limit selector switch means associated with said control and arranged to respond to movement of said controller for limiting the movement of said gun in the direction selected, said limit means including conductors and a relay-controlled switch connected to each of said power means for dynamically braking said power means.

GEORGE W. PONTIUS, III.
FRANK V. KUZMITZ.